United States Patent [19]

Wakamaeda et al.

[11] Patent Number: 5,453,289
[45] Date of Patent: Sep. 26, 1995

[54] METHOD OF PROCESSING ALASKA POLLACK ROE

[75] Inventors: Atsushi Wakamaeda, Ibaraki; Shinichiro Nishimoto, Fukuoka; Mitsuru Mishima, Tokyo; Kiyoshi Aihara, Tokyo; Masaaki Ogiwara, Tokyo; Shunichi Tsunematsu, Tokyo; Fumio Hirata, Ibaraki, all of Japan

[73] Assignee: Maruha Corporation, Tokyo, Japan

[21] Appl. No.: 264,920

[22] Filed: Jun. 24, 1994

[30] Foreign Application Priority Data

Jul. 2, 1993 [JP] Japan .................................. 5-164357

[51] Int. Cl.⁶ .................................................. A23L 1/328
[52] U.S. Cl. ........................................ 426/643; 426/519
[58] Field of Search .................................. 426/238, 643, 426/519

[56] References Cited

U.S. PATENT DOCUMENTS

| 1,623,601 | 4/1927 | Smith | 426/643 |
| 4,477,476 | 10/1984 | Kagawa et al. | 426/643 X |

FOREIGN PATENT DOCUMENTS

| 59-6862 | 1/1984 | Japan | 426/643 |
| 61-271966 | 2/1986 | Japan | 426/643 |
| 63-146770 | 6/1988 | Japan | 426/643 |
| 2-268664 | 11/1990 | Japan | 426/643 |
| 5-91858 | 4/1993 | Japan | 426/643 |
| 6-38718 | 2/1994 | Japan . | |

*Primary Examiner*—Arthur L. Corbin
*Attorney, Agent, or Firm*—Young & Thompson

[57] ABSTRACT

A method of processing Alaska pollack roe which comprises placing the Alaska pollack roe in a multi-perforated container and salting said roe while vibrating said container.

6 Claims, No Drawings

METHOD OF PROCESSING ALASKA POLLACK ROE

BACKGROUND OF THE INVENTION

1. Field of the Invention

The present invention relates to a method of processing Alaska pollack roe, and more particularly, to a novel method of processing Alaska pollack roe in the production of Alaska pollack roe products such as salted Alaska pollack roe and karashi-mentaiko (Alaska pollack roe pickled in red pepper sauce).

2. Description of the Prior Art

In general, the quality of Alaska pollack roe (roe quality) varies considerably depending on, for example, the season, fishing area and method of fishing, the post-fishing storage conditions and the method of roe collection. For example, the roe of Alaska pollack caught around the spawning season near the spawning ground is overmature and is massed in large ovaries. In contrast, the ovaries of the roe of Alaska pollack in the pre-spawning stage are small, and the roe is immaturely developed.

The quality of the roe also varies depending on the post-fishing storage conditions of the Alaska pollack. For example, when pressure or impact is applied to the body of Alaska pollack, there is a high tendency toward adhesion of bile pigments to and infiltration of hemachromes from the intestinal tract into the ovaries. Also, when the body is overcooled, part or all of the ovaries freeze.

Furthermore, the quality of the roe is affected by the method of roe collection and method of treatment of the roe after collection; for example, the ovaries may be cut, the ovarian membrane torn, the roe granules crushed, or the roe contaminated with internal organs other than the ovaries.

In addition, because the size of the ovaries varies depending on the age and body size of the Alaska pollack, there are greatly differing quality of roe used as the starting material, and it changes easily. In other words, there is wide variation among the starting materials. Accordingly, the methods of preparing Alaska pollack roe products have a disadvantage in that strict selection must be made of the starting material, while the method of processing the material must also be modified depending on the quality of the roe selected. As a result it is difficult to establish definite standard conditions for methods of producing Alaska pollack roe products, and thus under the existing circumstances they are prepared under conditions which are determined based on the perception and experience of the persons in charge for the respective starting materials.

The most important step in the production of Alaska pollack roe products is that of salting, in which additives such as common salt, seasonings and coloring agents, together with water, are added to and mixed with the Alaska pollack roe. The conventional process for this step employs a rotary cask. The rotary cask apparatus rotates the cask at predetermined intervals to thoroughly mix the additives with the Alaska pollack roe placed in the cask, thus promoting the migration (penetration) of the salt, seasonings, coloring agents, etc. into the Alaska pollack roe.

However, the rate of migration of the additives into the roe varies depending on their type and concentration, and therefore uniform migration of the additives to the center of the Alaska pollack roe is not achieved with the above mentioned rotary cask apparatus. In addition, as discussed above, the quality of the resulting Alaska pollack roe products also varies considerably depending on the state of the initial Alaska pollack roe, and this variation in quality has become a problem in the production of Alaska pollack roe products.

Furthermore, since Alaska pollack roe is covered only with a soft ovarian membrane, it is susceptible to physical impact, and particularly shear stress, which causes it to break. Also, because of the ovarian membrane the Alaska pollack ovaries are obtained clinging together in pairs of two (paired ovaries), but upon the slightest impact the ovarian membrane tears to result in unpaired ovaries. Consequently, the greatest care must be taken in handling Alaska pollack roe during the various steps of selection, salting, draining, freezing, etc.

As mentioned above, Alaska pollack roe is associated with the problems of 1. variation in quality and 2. susceptibility to damage of the ovarian membrane, and therefore it is disadvantaged in that the methods for its processing are not always the same, they require a large number of workers and much time, and the automation and simplification of the process is not easy.

SUMMARY OF THE INVENTION

Accordingly, it is an object of the present invention to provide a method for processing Alaska pollack roe whereby Alaska pollack roe products with uniform quality may be produced at a high yield.

The present inventors have conducted extensive studies regarding methods for processing Alaska pollack roe during the production of Alaska pollack roe products such as salted Alaska pollack roe and karashi-mentaiko, giving particular attention to methods of salting Alaska pollack roe, and as a result we have found that by placing Alaska pollack roe in a container of a certain shape for salting, it is possible to obtain a product wherein the quality of the Alaska pollack roe is extremely uniform and without much variation, and wherein the ovarian membrane of the Alaska pollack roe has few flaws.

The present invention, which has been completed based on this finding, provides a method of processing Alaska pollack roe which is characterized in that the Alaska pollack roe is placed in a container with multiple perforations for salting.

The method of processing Alaska pollack roe according to the present invention makes it possible to produce Alaska pollack roe products of uniform quality at a high yield.

DETAILED DESCRIPTION OF THE INVENTION

A more detailed explanation of the method of processing Alaska pollack roe according to the present invention will now be given based on a preferred embodiment thereof.

Although the Alaska pollack roe to be used as the starting material in the method of processing Alaska pollack roe according to the present invention is preferably taken out of Alaska pollack immediately after fishing, Alaska pollack roe taken from Alaska pollack which has been kept at a low temperature for 1 or 2 days or longer after fishing may also be used as the starting material, as well as frozen Alaska pollack roe after thawing.

Furthermore, the Alaska pollack roe to be used preferably meets the conditions of roe quality that it should have a uniform size and weight, the same degree of maturity, a similar surface color, an undamaged ovarian membrane, etc.

Of these roe quality conditions, it is particularly important to take great care so as not to select Alaska pollack roe with damage to the ovarian membrane, because of the possibility that the Alaska pollack roe granules spill out of the damaged section thus lowering the yield.

To carry out the method of processing Alaska pollack roe according to the present invention, the Alaska pollack roe selected in the above manner is measured out into fixed weight portions corresponding to the volume of the containers with multiple perforations, and placed therein for salting.

The salting is performed in the following manner.

That is, after the Alaska pollack roe is placed as fixed weight portions in the containers with multiple perforations, the containers are in turn placed in a container for salting (salting container), premeasured additives are poured into the salting container and thoroughly mixed with the Alaska pollack roe, and then the salting is performed. The mixing/salting method may be a commonly used method which employs a rotary cask, or a method in which the fish roe is transferred from cask to cask by hand, but it is most preferably the mixing/salting method described in the specification of Japanese Patent Application No. HEI 5-120109, i.e., a method in which vibration is applied to the salting container and thus to both the additives and the Alaska pollack roe held in the multi-perforated containers, and the mixing/salting is executed by the vibration. The mixing/salting method involving the application of vibration is explained in detail below.

The additives to be used for the salting in the method of processing Alaska pollack roe according to the present invention may be any additives which are commonly used for salting Alaska pollack roe, and examples thereof include common salt, sodium glutamate and sodium malate.

Also, any additives other than the ones mentioned above may be added so long as they are suitable as food additives and have no adverse effect on the quality of Alaska pollack roe products, and this includes, for example, lipotide, sodium nitrite, phosphates and sorbitol.

Of the above mentioned additives including common salt, the addition of common salt is essential, and the amount of common salt to be added is preferably 5–20 parts by weight, and more preferably 7–13 parts by weight, to 100 parts by weight of Alaska pollack roe. In addition, the optimum amount of the common salt may be appropriately varied depending on the quality of the Alaska pollack roe and the amounts of added components other than common salt, such as water, etc. Alternatively, a portion of the common salt may be replaced by a neutral inorganic salt such as potassium chloride (KCl) or the like, which consists of monovalent elements.

Of the above mentioned additives, the addition of water is also an essential as is the addition of common salt, and the amount of water to be added to the Alaska pollack roe will likewise depend on the state of the Alaska pollack roe, but preferably it is added at 10–150 parts by weight, and more preferably at 30–80 parts by weight, to 100 parts by weight of the Alaska pollack roe. If the amount of water added is less than 10 parts by weight then there will be little effect by keeping the Alaska pollack roe in the multi-perforated container, and if it is greater than 150 parts by weight then the quality of the resulting Alaska pollack roe product, and particularly its hardness, will be reduced, and thus neither condition is desirable.

An important point in the method of processing Alaska pollack roe according to the present invention resides in that the combination of the additives must be selected so as to give a salt content of the salted Alaska pollack roe product of 2.5% by weight or more and a water content thereof of 59% by weight or more.

The term "salt content" as used herein refers to the concentration of common salt (NaCl) calculated in terms of either $Na^+$ ions or $Cl^-$ ions.

If the salt content of the salted Alaska pollack roe product is less than 2.5% by weight or the water content thereof is less than 59% by weight, the quality of the product including texture is notably impaired, and thus such contents are undesirable.

The additives may be, for example, in any solid (powdery) or liquid form, though it is preferable that these additives be homogeneously dissolved when mixed with the Alaska pollack roe.

In the above mentioned addition step, the temperature of the Alaska pollack roe is preferably from 0° to 35° C., and more preferably from 5° to 25° C. A roe temperature lower than 0° C. is not preferable, since the roe is sometimes frozen in such cases, while a roe temperature exceeding 35° C. is not preferable either, since this will facilitate the growth of bacteria in the Alaska pollack roe.

The temperature of the additives to be added to the Alaska pollack roe is preferably 70° C. or lower, because if the temperature exceeds 70° C., the surface proteins of the Alaska pollack roe undergo denaturation, leading to a deteriorated quality of the obtained Alaska pollack roe product.

The method of premixing the above mentioned additives with the Alaska pollack roe held in the multi-perforated containers prior to the salting may be, for example, a method in which the salting container is tumbled end-over-end or rotated to mix the contents, a method in which the contents of the salting container are stirred using blades, or a method in which the mixing is effected by applying vibration to the salting container.

These mixing methods are used to mix the Alaska pollack roe and the additives, and then salting is carried out. Also, the salting is preferably performed while applying vibration, as described below.

The term "vibration" as used herein means the movement of an object which accompanies the change with time of the magnitude of momentum of the object repeatedly alternating between a larger value and a smaller value based on a standard level.

The vibration generator to be used according to the present invention is preferably, for example, a mechanical vibration generator such as a vibration motor, piston or shaker (including rotating, horizontal, vertical and reciprocal movement), or a vibration generator which uses sonic waves, underwater waves, bubbling or flowing water. Of these vibration generators, the above mentioned mechanical ones are particularly preferred, but the method and device for generating the vibration is not particularly restricted, so long as it allows the vibration conditions specified below to be achieved.

The method of applying the vibration to the salting container using a vibration generator such as described above may be one in which the salting container is positioned at a place where the vibration is generated, one in which the salting container itself is vibrated, or one in which a vibrator is placed in the salting container.

The magnitude of the vibration applied can be expressed in three physical parameters, namely displacement, velocity and acceleration, and according to the present invention the magnitude of the vibration applied preferably involves a displacement of 0.01–500 mm, a velocity of 1–1000 m/sec, and an acceleration of 0.01–20 G (G being gravitational acceleration), and more preferably a displacement of 0.05–100 mm, a velocity of 5–200 mm/s and an acceleration of 0.5–5 G.

Two or more kinds of vibration may be combined together, so long as the vibration conditions fall within the above mentioned ranges for the respective physical parameters.

If the magnitude of each of the above physical parameters is smaller than the minimum values specified above, the vibration cannot exert any effect during the salting, and if their magnitude exceeds the maximum values it will result in deformation of or damage to the Alaska pollack roe placed in the salting container, and thus neither situation is preferred.

Although the temperature during the above vibration step is not particularly restricted, the temperature of the Alaska pollack roe while in the above salting container is preferably set within the range of 0°–35° C., and more preferably within the range of 5°–25° C.

If the temperature of the Alaska pollack roe is lower than 0° C. it will sometimes freeze, while if it is higher than 35° C. the growth of bacteria will be facilitated, and thus neither is preferred.

The vibration time preferably ranges from 2 to 48 hours, and more preferably from 6 to 24 hours, and this will vary depending on the intensity of the vibrations as well as the state of the initial Alaska pollack roe, the quality demanded for the product, etc.

If the vibration time is shorter than 2 hours, the salting of the Alaska pollack roe cannot be fully effected, while if it exceeds 48 hours the roe granules will be broken or growth of bacteria will occur in the Alaska pollack roe, thus impairing the quality of the product, and thus neither condition is preferred. Although it is preferable to apply continuous vibration, intermittent vibration can give the same satisfactory salting results.

The multi-perforated container to be used according to the present invention may be a lattice container such as a basket, crate or the like, or a mesh-like container such as a net bag, etc. The shape, size and quality of material of the container is not particularly restricted, but it should be of a shape, size and quality of material capable of housing the Alaska pollack roe. Containers of different shapes and sizes may also be used together. Also, the area occupied by the perforations is 3% or more, preferably 10% or more, and more preferably 30% or more of the entire surface area of the container.

Furthermore, the multi-perforated container according to the present invention includes both containers whose entirety consists of multi-perforated sections and those only a section of which consists of multi-perforated sections.

The material of which the above mentioned multi-perforated container is constructed must be stable even when placed in water, and examples thereof include synthetic polymer materials such as polyethylene, nylon, teflon, plastic and gum, as well as metallic materials such as iron and stainless steel and natural polymer materials such as cotton and flax, though it is not necessarily limited to these. Of the above mentioned ones, containers made of plastic materials are preferred. Containers made of rigid materials are also preferred so long as their shapes are readily changeable.

According to the present invention, addition of the Alaska pollack roe which is placed in the multi-perforated containers as mentioned above followed by salting, preferably while applying vibration under the vibration conditions described above, makes it possible for the salt, seasonings, coloring agents, etc. to penetrate to the center of the Alaska pollack roe.

The steps following the step of salting may be according to conventional methods. Namely, the Alaska pollack roe is washed with water while in the multi-perforated containers, and is then drained, trimmed, packed and frozen. The Alaska pollack roe may also be taken out of the containers to be washed with water, and then drained, trimmed, packed and frozen.

The salt content and water content of the prepared Alaska pollack roe may be adjusted to respective levels of 2.5% by weight or more and 59% by weight or more by carrying out the steps for the processing of Alaska pollack roe described above.

Salted Alaska pollack roe products judged as being excellent in quality have an adjusted salt content of 2.5% by weight or more and an adjusted water content of 59% by weight or more, whereas those having a salt content and a water content lower than these levels are not preferred as they are judged as having a hard texture of the center of the ovary like mochi (rice cake), lack of a granular texture of the roe during eating, caused by poor structure of the roe granules, lack of a salty taste, etc.

A suitable salt content for salted Alaska pollack roe is 2.5% by weight or more and preferably 4.0% by weight or more, while a suitable water content is 59% by weight or more and preferably 63% by weight or more.

As in the case of the salted Alaska pollack roe mentioned above, a water content of 59% by weight or more and a salt content of 2.5% by weight or more are also preferable when the roe is to be used as the starting material for producing karashi-mentaiko.

The degree of damage of the ovarian membranes in Alaska pollack roe products obtained by the method of processing Alaska pollack roe according to the present invention (Alaska pollack roe damage ratio) is very low when compared to products obtained by conventional methods, and therefore an increase in efficiency of the steps of processing Alaska pollack roe may be achieved.

The following Examples are given to more concretely illustrate the method of processing Alaska pollack roe according to the present invention, but it is in no way limited to these Examples. The amounts of the fish roe and amounts of additives to the fish roe used in the following Examples 1 and 2 are shown in Table 1.

EXAMPLE 1

Twenty kilograms of Alaska pollack roe (collected from fish 40 hours after fishing, having an unpaired ovary weight of 80–150 grams, suffering from no flaws on the surface and having a nearly uniform color) was placed in four 5 kg polyethylene net bags (area occupied by perforations: 80–90%, average: 85%) which were in turn placed in a plastic salting container, and the additives listed in Table 1 were each added to the above mentioned Alaska pollack roe in the plastic container, after which the Alaska pollack roe was salted while applying vibration using a shaker for 12 hours at a room temperature of 15° C. Here, the vibration involved a displacement of 20 mm, a velocity of 50–100 mm/s and an acceleration of 1.5 G.

Post-salting steps were performed according to conventional methods. However, the Alaska pollack roe was washed with water while still in the net bags, and was drained and placed on pans for storage in a frozen state. After 6 months of storage in a frozen state, it was thawed at 10° C.

The salted Alaska pollack roe obtained according to the present invention was subjected to quality evaluations, including an organoleptic evaluation, salt content measurement and water content measurement, explained below. The results are shown in Table 2. A control product of salted Alaska pollack roe was prepared under the same conditions as in Example 1, except that the Alaska pollack roe was not placed in net bags. The quality of the salted Alaska pollack roe obtained in this manner was also evaluated in the same manner as in Example 1. The results are shown in Table 2.

Organoleptic Evaluation of Ovary

Hardness of Alaska pollack roe
- 5: very hard
- 4: somewhat hard
- 3: moderately hard
- 2: somewhat soft
- 1: soft Granularity
- 5: distinct
- 4: somewhat distinct
- 3: normal
- 2: somewhat poorer
- 1: much poorer State of binding of granules to membrane
- 5: considerably more liberated granules
- 4: more liberated granules
- 3: same as control
- 2: fewer liberated granules
- 1: considerably fewer liberated granules

Damage Ratio of Ovarian Membranes

The damage ratio of the ovarian membranes is the proportion of the total weight of damaged ovarian membranes to the weight of the entire Alaska pollack roe, expressed as a percentage.

Salt Content

A 0.5–1 g portion of roe granules was collected from the center of the ovary or its periphery and homogenized with addition of 9 times as much distilled water, after which the salt content of the filtrate was measured with a simplified salt meter (manufactured by Horiba Co.)

Water Content

A 0.5–1 g portion of roe granules was collected from the center of the ovary or its periphery and the water content was determined by the atmospheric heat drying method (105° C., 24 hours).

TABLE 1

| Staring material and additives | Weight |
| --- | --- |
| Fish roe | 20 kg |
| Common salt | 2.0 kg |

TABLE 1-continued

| Staring material and additives | Weight |
| --- | --- |
| Sodium glutamate | 100 g |
| Sodium malate | 100 g |
| Sodium ascorbate | 30 g |
| Lipotide | 5 g |
| Sodium nitrite | 0.12 g |
| Water | 10 kg |

TABLE 2

| Evaluation items | | Control | Example 1 |
| --- | --- | --- | --- |
| Hardness of salted roe | | 3 | 4 |
| Granularity | | 4 | 4 |
| State of granules binding to membrane | | 3 | 3 |
| Common salt concentration (wt %) | Periphery of ovary | 5.5 | 5.8 |
| | Center of ovary | 4.6 | 4.2 |
| Water content (wt %) | Periphery of ovary | 65.7 | 64.2 |
| | Center of ovary | 64.4 | 63.5 |
| Texture of center | | Satisfactory granularity | Satisfactory granularity |
| Damage ratio of ovarian membranes (%) | | 11 | 2 |

As is clear from the results shown in Table 2, the salted Alaska pollack roe in Example 1 was of better quality and had a lower ratio of damage of the ovarian membranes in comparison with the salted Alaska pollack roe used as the control.

EXAMPLE 2

Ten kilograms of Alaska pollack roe having the same roe quality as in Example 1 above was placed into each of 2 plastic crates (area occupied by perforations: 30–40%, average: 35%), and the crates were in turn placed in a plastic salting container and the additives listed in Table 1 were added to the Alaska pollack roe in the plastic container, after which the salting container was vibrated at room temperature (displacement: 0.08 mm, velocity: 20 mm/s, acceleration: 0.3 G) and further placed on a vibrating plate (displacement: 30 mm, velocity: 20 mm/sec, acceleration: 1 G). After salting the Alaska pollack roe while applying vibration for 9 hours, the crates were taken out, and the roe was washed according to a conventional method and drained, and a part of the resulting salted Alaska pollack roe was stored in a frozen state.

After 3 months of storage in a frozen state, the product was thawed at room temperature and its quality evaluated in the same manner as in Example 1. The results are shown in Table 3.

The remaining salted Alaska pollack roe which had not been frozen (non-frozen product) was also evaluated in the same manner as in Example 1. The results are shown in Table 4.

Controls of the frozen salted roe and the non-frozen salted roe were also prepared under the same conditions as in Example 2, except that the Alaska pollack roe was not placed in crates. The quality of each of the salted Alaska pollack roe products obtained in this manner was also evaluated as in Example 1. The results are shown in Tables 3 and 4, respectively.

TABLE 3

| Evaluation items | | Frozen control | Example 2 (frozen product) |
|---|---|---|---|
| Hardness of salted roe | | 3 | 4 |
| Granularity | | 3 | 3 |
| State of granules binding to membrane | | 3 | 3 |
| Common salt concentration (wt %) | Periphery of ovary | 6.1 | 6.2 |
| | Center of ovary | 3.7 | 3.8 |
| Water content (wt %) | Periphery of ovary | 67.0 | 65.9 |
| | Center of ovary | 66.3 | 65.4 |
| Texture of center | | Satisfactory granularity | Satisfactory granularity |
| Damage ratio of ovarian membranes (%) | | 12 | 4 |

As is clear for the results shown in Table 3, the frozen salted roe in Example 2 had a much lower ratio of damage of the ovarian membranes in comparison with the frozen control.

TABLE 4

| Evaluation items | | Non-frozen control | Example 2 (Non-frozen product) |
|---|---|---|---|
| Hardness of salted roe | | 3 | 4 |
| Granularity | | 4 | 4 |
| State of granules binding to membrane | | 3 | 3 |
| Common salt concentration (wt %) | Periphery of ovary | 6.3 | 5.9 |
| | Center of ovary | 4.3 | 4.2 |
| Water content (wt %) | Periphery of ovary | 67.0 | 66.1 |
| | Center of ovary | 66.0 | 64.9 |
| Texture of center | | Satisfactory | Satisfactory |

TABLE 4-continued

| Evaluation items | Non-frozen control | Example 2 (Non-frozen product) |
|---|---|---|
| Damage ratio of ovarian membranes (%) | granularity 9 | granularity 2.5 |

As is clear for the results shown in Table 4, the non-frozen salted roe in Example 2 had a much lower ratio of damage of the ovarian membranes in comparison with the non-frozen control.

What is claimed is:

1. A method of processing Alaska pollack roe, which comprises placing the Alaska pollack roe in a multi-perforated container, and salting the Alaska pollack roe in said multi-perforated container while vibrating said roe in said multi-perforated container, said vibrating resulting in a momentum change with time whereby movement of said roe during said vibrating alternates between a larger value and a smaller value based on a standard level, wherein said vibrating is carried out at a displacement of from 0.01 to 500 mm, at a gravitational acceleration of from 0.01 to 20 G and at a velocity of from 1 to 1,000 mm/sec.

2. A method as claimed in claim 1, wherein said displacement is 0.05–100 mm, said velocity is 5–200 mm/sec and said acceleration is 0.5–5 G.

3. A method as claimed in claim 1, wherein said multi-perforated container has an area occupied by perforations of at least 3%.

4. A method as claimed in claim 1, wherein said multi-perforated container has an area occupied by perforations of at least 10%.

5. A method as claimed in claim 1, wherein said multi-perforated container has an area occupied by perforations of at least 30%.

6. A method as claimed in claim 1, wherein said multi-perforated container is a net bag.

* * * * *

UNITED STATES PATENT AND TRADEMARK OFFICE
CERTIFICATE OF CORRECTION

PATENT NO. : 5,453,289
DATED : September 26, 1995
INVENTOR(S) : Atsushi WAKAMEDA et al.

It is certified that error appears in the above—identified patent and that said Letters Patent is hereby corrected as shown below:

On the title page, Item 19, change the inventor's surname from "Wakamaeda" to --Wakameda--.

On the title page, Item 75, change the first inventor's surname from "Wakamaeda" to --Wakameda--.

Signed and Sealed this

Twenty-eighth Day of November 1995

Attest:

BRUCE LEHMAN

Attesting Officer

Commissioner of Patents and Trademarks